United States Patent
Li

(10) Patent No.: US 12,438,989 B2
(45) Date of Patent: Oct. 7, 2025

(54) AUDIO DEVICE AND CONTROL METHOD THEREOF

(71) Applicant: Merry Electronics(Shenzhen) Co., Ltd., ShenZhen (CN)

(72) Inventor: Hung-Yuan Li, New Taipei (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 193 days.

(21) Appl. No.: 18/485,328

(22) Filed: Oct. 12, 2023

(65) Prior Publication Data

US 2025/0080658 A1 Mar. 6, 2025

(30) Foreign Application Priority Data

Aug. 31, 2023 (TW) ................. 112132959

(51) Int. Cl.
*H04M 19/08* (2006.01)
*H04H 20/76* (2008.01)
*H04M 9/00* (2006.01)

(52) U.S. Cl.
CPC ............ *H04M 19/08* (2013.01); *H04H 20/76* (2013.01); *H04M 9/001* (2013.01)

(58) Field of Classification Search
CPC .... H04M 19/08; H04M 9/001; H04M 1/0274; H04M 1/73; H04H 20/76; Y02D 30/70; Y02D 10/00
See application file for complete search history.

(56) References Cited

U.S. PATENT DOCUMENTS

| | | | |
|---|---|---|---|
| 9,197,023 B2 * | 11/2015 | Bar-Niv | H01R 27/00 |
| 2006/0155545 A1 * | 7/2006 | Jayne | G11B 31/02 |
| 2012/0077384 A1 * | 3/2012 | Bar-Niv | H01R 27/00 |
| | | | 439/625 |
| 2013/0075149 A1 * | 3/2013 | Golko | H01R 13/658 |
| | | | 174/359 |
| 2013/0089291 A1 * | 4/2013 | Jol | G02B 6/3817 |
| | | | 439/660 |
| 2013/0095701 A1 * | 4/2013 | Golko | H01R 24/00 |
| | | | 439/660 |
| 2017/0164089 A1 * | 6/2017 | Lee | H04R 1/1025 |
| 2017/0256199 A1 * | 9/2017 | Bi | G09G 3/3233 |
| 2019/0252904 A1 * | 8/2019 | Tian | H02J 7/02 |
| 2020/0133908 A1 * | 4/2020 | Yin | G06F 13/4282 |
| 2020/0150720 A1 * | 5/2020 | Wang | G06F 1/166 |

* cited by examiner

*Primary Examiner* — Akelaw Teshale
(74) *Attorney, Agent, or Firm* — JCIPRNET

(57) ABSTRACT

An audio device and a control method thereof are provided. The audio device includes a charger and at least one audio broadcaster. The charger is coupled to a transmission line and is configured to generate a charging voltage. The audio broadcaster is coupled to the charger through the transmission line. The charger transmits the charging voltage to the audio broadcaster through the transmission line, and transmits first data to the audio broadcaster through the transmission line. The audio broadcaster transmits second data to the charger through the transmission line.

17 Claims, 6 Drawing Sheets

AUDIO DEVICE AND CONTROL METHOD THEREOF

CROSS-REFERENCE TO RELATED APPLICATION

This application claims the priority benefit of Taiwan application serial no. 112132959 filed on Aug. 31, 2023. The entirety of the above-mentioned patent application is hereby incorporated by reference herein and made a part of this specification.

BACKGROUND

Technical Field

The disclosure relates to an audio device and a control method thereof, and in particular relates to a bidirectional audio device that may transmit and receive data and a control method thereof.

Description of Related Art

In the conventional technical field, the charger and the audio broadcaster in an audio device may transmit data through two transmission lines by switching between 0 volts and 5 volts. In addition, in the conventional technology, only the charger as the master terminal may transmit data to the audio broadcaster, while the audio broadcaster cannot transmit data to the charger. As a result, conventional audio devices may only perform one-way data communication, resulting in failure to improve work efficiency. Moreover, conventional audio devices need to transmit data through signals with full-swing voltages, which require relatively high power consumption and may generate noise during the transmission process, reducing the quality of the audio signal.

SUMMARY

An audio device and a control method thereof are provided in the disclosure, in which a charger and an audio broadcaster may transmit and receive data in both directions.

The audio device of the disclosure includes a charger and at least one audio broadcaster. The charger is coupled to a transmission line and is configured to generate a charging voltage. The at least one audio broadcaster is coupled to the charger through the transmission line. The charger transmits the charging voltage to at least one audio broadcaster through the transmission line. The charger transmits first data to the at least one audio broadcaster through the transmission line. The charger receives second data from the at least one audio broadcaster through the transmission line.

The control method of the audio device of the disclosure includes the following operation. A charger and at least one audio broadcaster are coupled to each other through a transmission line. Charging voltage and first data are transmitted to the at least one audio broadcaster through the transmission line by the charger. Second data is transmitted to the charger through the transmission line by the at least one audio broadcaster.

Based on the above, in the audio device according to the embodiment of the disclosure, the charger transmits the charging voltage to the audio broadcaster through a transmission line. Moreover, through the same transmission line, the charger may transmit data to and from the audio broadcaster at the same time. In this way, while the audio broadcaster is charging, the charger may transmit and receive information with the audio broadcaster, effectively improving the efficiency of the audio device.

DETAILED DESCRIPTION OF DISCLOSED EMBODIMENTS

Figure 1:
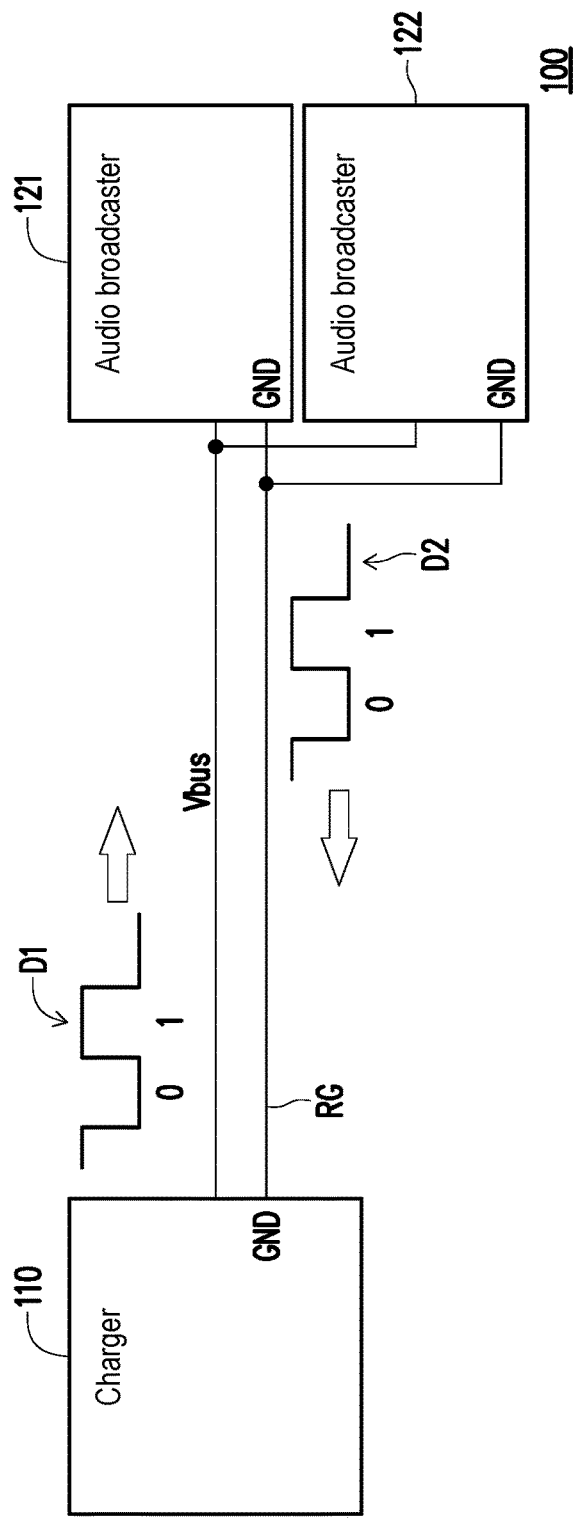
FIG. 1 is a schematic diagram of an audio device of an embodiment of the disclosure.

Referring to FIG. 1, FIG. 1 is a schematic diagram of an audio device of an embodiment of the disclosure. The audio device 100 includes a charger 110 and audio broadcasters 121 and 122. The charger 110 is coupled to the audio broadcasters 121 and 122 through the transmission line Vbus. In this embodiment, the ground terminals GND of the charger 110 and the audio broadcasters 121 and 122 may be coupled to the same reference ground line RG. The charger 110 is configured to generate a charging voltage, and may transmit the charging voltage to the audio broadcasters 121 and 122 through the transmission line Vbus to perform a charging operation on the batteries in the audio broadcasters 121 and 122. In addition, while the charging operation is being performed, the charger 110 may transmit the first data D1 to the audio broadcasters 121 and 122 through the transmission line. On the other hand, while the charging action is also being performed, one of the audio broadcasters 121 and 122 may transmit the second data D2 to the charger 110 through the transmission line Vbus.

It is worth mentioning that in this embodiment, the charger 110 and one of the audio broadcasters 121 and 122 may transmit the first data D1 and the second data D2 at the same time.

Figure 2:
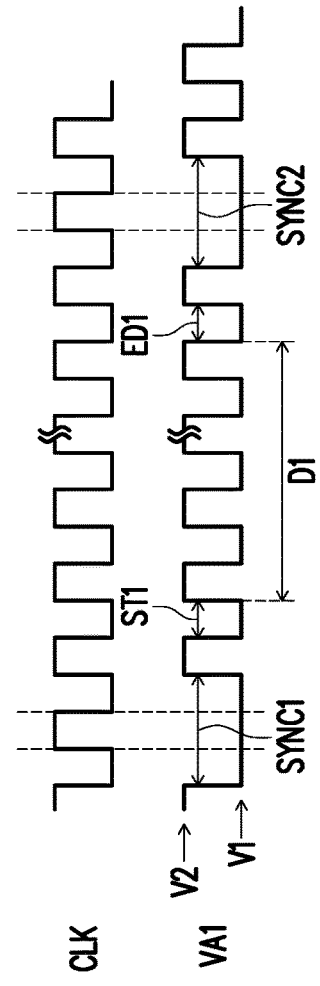
FIG. 2 is a waveform diagram of the data transmission operation between the charger and the audio broadcaster in the audio device of an embodiment of the disclosure.

For details of the data transmission between the charger 110 and the audio broadcasters 121 and 122, reference may be made to FIG. 2. FIG. 2 is a waveform diagram of the data transmission operation between the charger and the audio broadcaster in the audio device of an embodiment of the disclosure. Here, the charger 110 transmits the first data D1 to the audio broadcaster 121 as an example. The data transmission operation may be performed based on the clock signal CLK. In this embodiment, the charger 110, serving as the master terminal, may carry the first data D1 onto the charging voltage provided by the charger 110. The charger 110 may pull down or pull up the signal VA1 on the transmission line Vbus according to the logic value of the first data D1. In the initial state, the charger 110 may generate the sync signal SYNC1 by pulling down the signal VA1 to the voltage V1 and maintaining the signal VA1 for one and a half cycles of the clock signal CLK. The charger 110 may notify the audio broadcaster 121 at the slave terminal to start the transmission operation of the first data D1 through the sync signal SYNC1.

Then, in one cycle of the clock signal CLK following the sync signal SYNC1, the charger 110 may generate the start signal ST by first pulling up the signal VA1 to the voltage V2, and then pulling down the signal VA1 to the voltage V1. After the start signal ST, the charger 110 may pull up the signal VA1 to the voltage V2 or pull down the signal VA1 to the voltage V1 according to the logic value of the first data D1 to perform the transmission operation of the first data D1.

After completing the transmission operation of the first data D1, the charger 110 may generate the end signal ED by pulling down the signal VA1 to the voltage V1. If the aforementioned transmitted first data D1 cannot be correctly received by the audio broadcaster 121, the charger 110 may retransmit a sync signal SYNC2 to re-initiate the transmission operation of the first data D1.

Please note here that the charger 110 and the audio broadcaster 121 may pre-set the number of data bits for each data transmission operation. The transmitted first data D1 may include verification information, so that the receiving audio broadcaster 121 may check the correctness of the received first data D1.

In order to carry the first data D1 on the charging voltage, in the embodiment of the disclosure, the voltage value of the charging voltage may be substantially equal to the voltage value of the voltage V2. When the first data D1 to be transmitted is a logic value 0, the charger 110 may pull down the signal VA1 to the voltage V1. When the first data D1 to be transmitted is a logic value 1, the charger 110 may restore the signal VA1 to the voltage V2. It is worth noting that in this embodiment, the voltage V1 may be greater than the voltage value of the reference ground voltage and does not need to be pulled down to 0 volts, and the signal VA1 does not need to have a full swing. That is, during the transmission process of the first data D1, the transmission efficiency of the charging voltage on the transmission line Vbus may be effectively maintained, and the transmission speed of the first data D1 may also be improved.

On the other hand, the audio broadcaster 121 transmits the second data D2 to the charger 110 in a manner similar to the transmission method of the first data D1, which will not be described in detail here.

When the audio broadcaster 121 and the charger 110 transmit the second data D2 and the first data D1 synchronously, the audio broadcaster 121 and the charger 110 may determine the voltage value of the signal VA1 on the transmission line Vbus according the logic values of the second data D2 and the first data D1. When the first data D1 and the second data D2 are both logic value 1, the charger 110 and the audio broadcaster 121 may synchronously pull up the signal VA1 on the transmission line Vbus to the voltage V2. When the first data D1 and the second data D2 are both logic value 0, the charger 110 and the audio broadcaster 121 may synchronously pull down the signal VA1 on the transmission line Vbus to the voltage V1. When the first data D1 and the second data D2 are logic values 0 and 1, or 1 and 0, one of the charger 110 and the audio broadcaster 121 may pull up the signal VA1 on the transmission line Vbus, the other one of the charger 110 and the audio broadcaster 121 may pull down the signal VA1 on the transmission line Vbus, such that the signal VA1 is an intermediate voltage between the voltages V1 and V2.

Continuing the above description, the charger 110 and the audio broadcaster 121 may respectively recognize the logic values of the second data D2 and the first data D1 according to the magnitude of the signal VA1. When the signal VA1 is substantially equal to the voltage V1, the charger 110 and the audio broadcaster 121 may respectively recognize that the second data D2 and the first data D1 are logic values 1 and 1. When the signal VA1 is substantially equal to the voltage V2, the charger 110 and the audio broadcaster 121 may respectively recognize that the second data D2 and the first data D1 are logic values 0 and 0. It is worth mentioning that when the signal VA1 is at the intermediate voltage, the logic values of the first data D1 and the second data D2 are complementary. Therefore, the charger 110 may determine the logic value of the received second data D2 according to the logic value of the first data D1 that the charger 110 has transmitted. Similarly, the audio broadcaster 121 may determine the logic value of the received first data D1 according the logic value of the second data D2 that the audio broadcaster 121 has transmitted.

Figure 3:
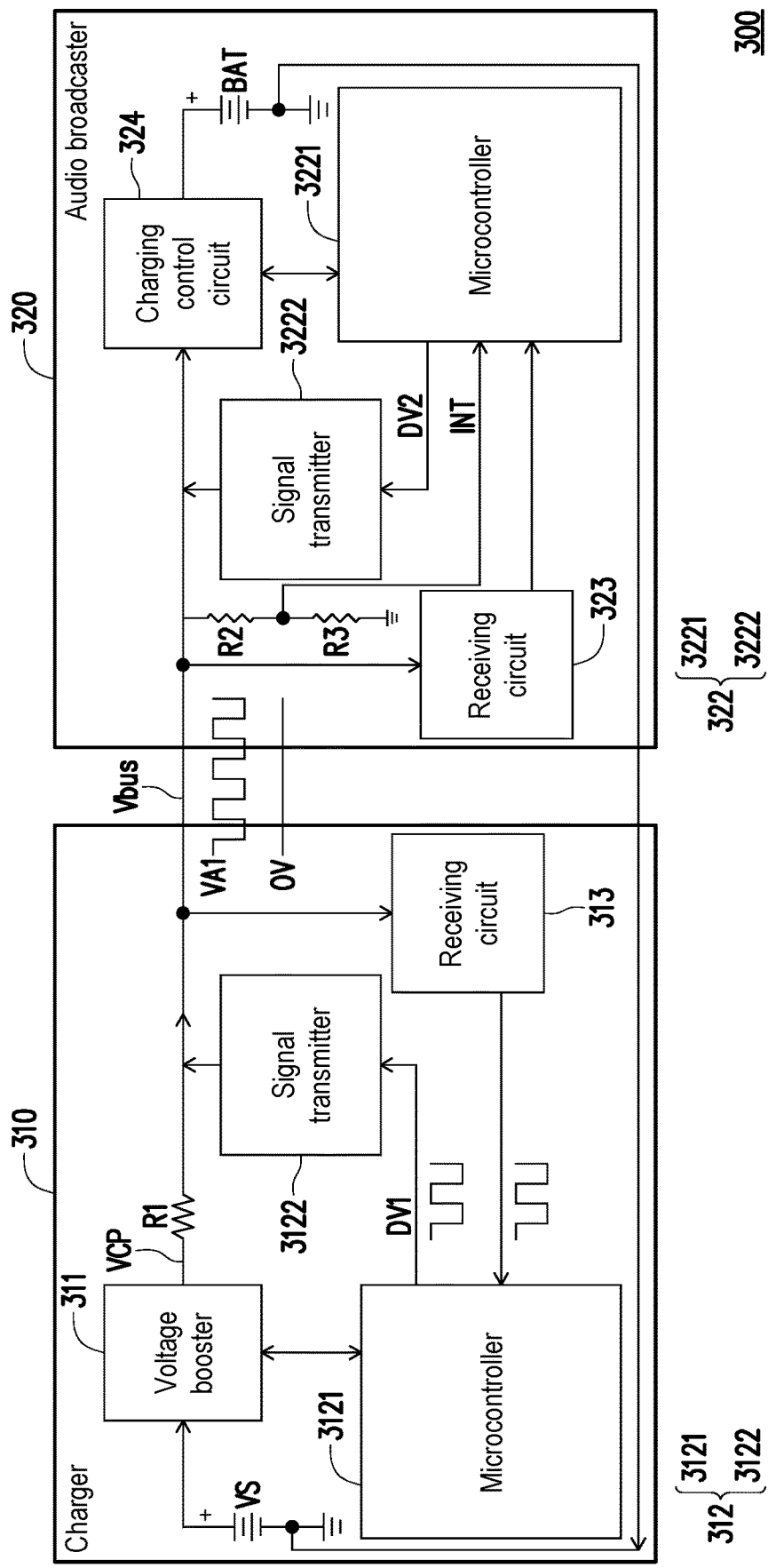
FIG. 3 is a schematic diagram of an audio device of another embodiment of the disclosure.

Referring to FIG. 3, FIG. 3 is a schematic diagram of an audio device of another embodiment of the disclosure. The audio device 300 includes a charger 310 and an audio broadcaster 320. The audio broadcaster 320 is, for example, an earbud. The charger 310 and the audio broadcaster 320 are coupled to each other through a transmission line Vbus. The charger 310 includes a charging voltage generating circuit which is a voltage booster 311, a control circuit 312, and a receiving circuit 313. The voltage booster 311 generates the charging voltage VCP according to the source voltage VS, and provides the charging voltage VCP to the transmission line Vbus through the resistor R1. In this embodiment, the voltage booster 311 may be a DC to DC voltage converter, which is configured to convert and boost the source voltage VS that is a DC voltage to generate the charging voltage VCP.

The control circuit 312 includes a microcontroller 3121 and a signal transmitter 3122. The microcontroller 3121 is coupled to the signal transmitter 3122, the receiving circuit 313, and the voltage booster 311. The signal transmitter 3122 is further coupled to the transmission line Vbus. The output terminal of the microcontroller 3121 may transmit the driving signal DV1 to the signal transmitter 3122 according to the logic value of the first data to be transmitted, so that the signal transmitter 3122 determines whether to pull down the signal VA1 on the transmission line Vbus according to the driving signal DV1. For example, when the logic value of the first data is 0, the microcontroller 3121 may transmit the driving signal DV1 with the logic value 0 to the signal transmitter 3122, and the signal transmitter 3122 pulls down the signal VA1 on the transmission line Vbus according to the driving signal DV1. In contrast, when the logic value of the first data is 1, the microcontroller 3121 may transmit the driving signal DV1 with the logic value 1 to the signal transmitter 3122, and the signal transmitter 3122 stops pulling down the signal VA1 on the transmission line Vbus according to the driving signal DV1 and restores the signal VA1 on the transmission line Vbus to a normal voltage value.

On the other hand, the audio broadcaster 320 includes a control circuit 322, a receiving circuit 323, and a charging control circuit 324. The charging control circuit 324 is coupled between the transmission line Vbus and the battery BAT. The charging control circuit 324 receives the signal VA1 on the transmission line Vbus and charges the battery BAT according to the signal VA1.

In addition, the control circuit 322 includes a microcontroller 3221 and a signal transmitter 3222. The microcontroller 3221 is coupled to the charging control circuit 324, the signal transmitter 3222, and the receiving circuit 323. The signal transmitter 3222 is further coupled to the transmission line Vbus. The output terminal of the microcontroller 3221 may transmit the driving signal DV2 to the signal transmitter 3222 according to the logic value of the second data to be transmitted, so that the signal transmitter 3222 determines whether to pull down the signal VA1 on the transmission line Vbus according to the driving signal DV2. For example, when the logic value of the second data is 0, the microcontroller 3221 may transmit the driving signal DV2 with the logic value 0 to the signal transmitter 3222, and the signal transmitter 3222 pulls down the signal VA1 on the transmission line Vbus according to the driving signal DV2. In contrast, when the logic value of the second data is 1, the microcontroller 3221 may transmit the driving signal DV2 with the logic value 1 to the signal transmitter 3222, and the signal transmitter 3222 stops pulling down the signal VA1 on the transmission line Vbus according to the driving signal DV2 and restores the signal VA1 on the transmission line Vbus to a normal voltage value.

Regarding the reception of data, in the charger 310, the receiving circuit 313 is coupled to the transmission line Vbus and the input terminal of the microcontroller 3121. The receiving circuit 313 is configured to receive the signal VA1 on the transmission line Vbus, and the AC component signal of the signal VA1 may be obtained by filtering out the DC component signal of the signal VA1. Furthermore, the receiving circuit 313 may obtain the second data according to the AC component signal of the signal VA1. In terms of detailed operations, the receiving circuit 313 may amplify the AC component signal of the signal VA1 to obtain read data, and transmit the read data to the input terminal of the microcontroller 3121. The microcontroller 3121 may perform an analog-to-digital conversion operation on the read data in analog form, so that the second data in digital form may be obtained.

In the audio broadcaster 320, the receiving circuit 323 is coupled to the transmission line Vbus and the input terminal of the microcontroller 3221. The receiving circuit 323 is configured to receive the signal VA1 on the transmission line Vbus, and the AC component signal of the signal VA1 may be obtained by filtering out the DC component signal of the signal VA1. Furthermore, the receiving circuit 323 may obtain the first data according to the AC component signal of the signal VA1. In terms of detailed operations, the receiving circuit 323 may amplify the AC component signal of the signal VA1 to obtain read data, and transmit the read data to the input terminal of the microcontroller 3221. The microcontroller 3221 may perform an analog-to-digital conversion operation on the read data in analog form, so that the first data in digital form may be obtained.

Incidentally, in the embodiment of the disclosure, the audio broadcaster 320 may be further provided with a voltage dividing circuit formed of resistors R2 and R3. The resistors R2 and R3 are configured to divide the voltage of the signal VA1, and when the voltage value of the signal VA1 is abnormal, the audio broadcaster 3221 is notified of the abnormal phenomenon of the signal VA1 through the generated interrupt signal INT.

Figure 4:
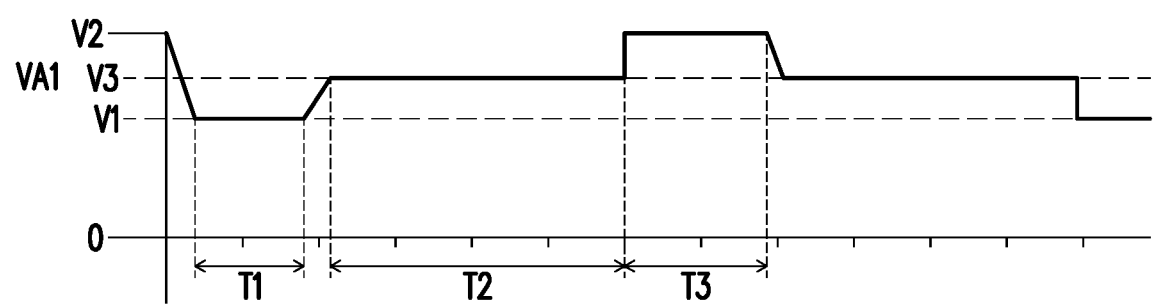
FIG. 4 is a voltage waveform diagram of a transmission line in an audio device of an embodiment of the disclosure.

Referring to FIG. 3 and FIG. 4 at the same time, FIG. 4 is a voltage waveform diagram of a transmission line in an audio device of an embodiment of the disclosure. When the charger 310 and the audio broadcaster 320 synchronously perform the transmission operation of the first data and the second data, the signal transmitters 3122 and 3222 may simultaneously adjust the voltage on the transmission line Vbus according to the logic values of the first data and the second data. In FIG. 4, during the time interval T1, both the first data and the second data are logic values 0, and the signal transmitters 3122 and 3222 may simultaneously pull down the signal VA1 on the transmission line Vbus to the voltage V2. During the time interval T2, the first data and the second data respectively are logic values 0 and 1, or 1 and 0, and the signal transmitters 3122 and 3222 may pull the signal VA1 on the transmission line Vbus to the intermediate voltage V3. Then, during the time interval T3, both the first data and the second data are logic values 1, and the signal transmitters 3122 and 3222 may simultaneously pull up the signal VA1 on the transmission line Vbus to the voltage V1.

Correspondingly, during the time interval T1, the receiving circuit 313 of the charger 310 and the receiving circuit 323 of the audio broadcaster 320 may respectively determine that the second data and the first data are logic values 0 and 0 according to the voltage value of the signal VA1. During the time interval T2, the receiving circuit 313 of the charger 310 and the receiving circuit 323 of the audio broadcaster 320 may respectively be the logic values according to the first data and the second data transmitted by their respective signal transmitters 3122 and 3222, and respectively determine that the second data and the first data are logic values 0 and 1, or 1 and 0 according to the voltage value of the signal VA1. During the time interval T3, the receiving circuit 313 of the charger 310 and the receiving circuit 323 of the audio broadcaster 320 may respectively determine that the second data and the first data are logic values 1 and 1 according to the voltage value of the signal VA1.

Figure 5:
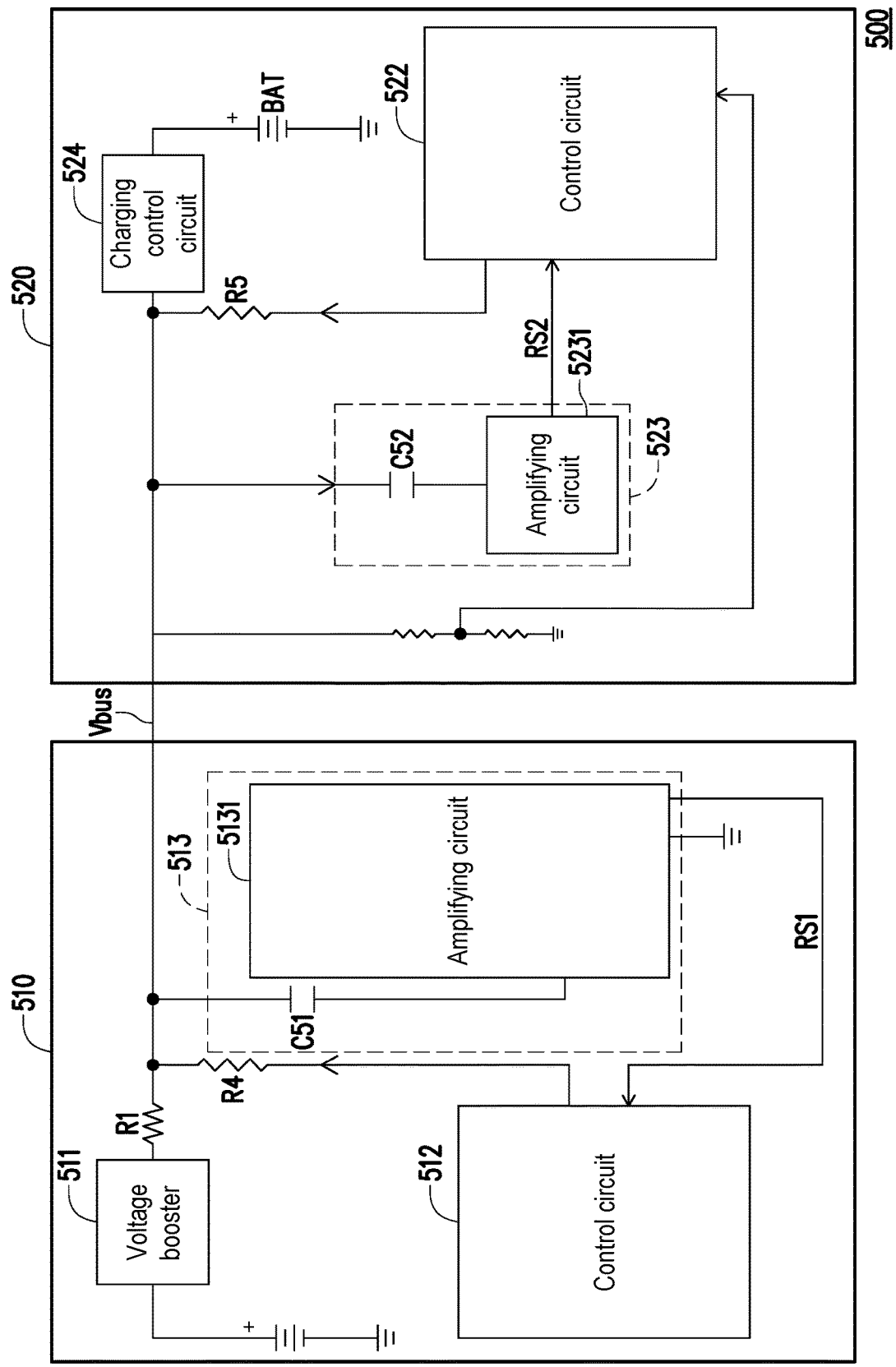
FIG. 5 is a schematic diagram of an audio device of another embodiment of the disclosure.

Referring to FIG. 5, FIG. 5 is a schematic diagram of an audio device of another embodiment of the disclosure. The audio device 500 includes a charger 510 and an audio broadcaster 520. The charger 510 is coupled to the audio broadcaster 520 through the transmission line Vbus. The charger 510 includes a voltage booster 511, a control circuit 512, and a receiving circuit 513. The audio broadcaster 520 includes a control circuit 522, a receiving circuit 523, and a charging control circuit 524. In this embodiment, the signal transmitter of the charger 510 is built in the control circuit 512 and is coupled to the transmission line Vbus through the resistor R4. The signal transmitter of the audio broadcaster 520 may also be built in the control circuit 522 and coupled to the transmission line Vbus through the resistor R5.

When the charger 510 intends to pull down the signal on the transmission line Vbus, the control circuit 512 may provide a bias voltage to the resistor R4 and pull down the voltage on the transmission line Vbus through the resistor R4. When the charger 510 does not intend to pull down the signal on the transmission line Vbus, the control circuit 512 may float the terminal coupled to the resistor R4. Similarly, when the audio broadcaster 520 intends to pull down the signal on the transmission line Vbus, the control circuit 522 may provide another bias voltage to the resistor R5 and pull down the signal on the transmission line Vbus through the resistor R5. When the audio broadcaster 520 does not intend to pull down the signal on the transmission line Vbus, the control circuit 522 may float the terminal coupled to the resistor R5.

In the charger 510, the receiving circuit 513 includes a capacitor C51 and an amplifying circuit 5131. The capacitor C51 is coupled in series between the transmission line Vbus and the amplifier circuit 5131. The amplifying circuit 5131 is coupled to the control circuit 512. The capacitor C51 is configured to receive the signal on the transmission line Vbus, to filter out the DC component signal on the transmission line Vbus, and to transmit the AC component signal on the transmission line Vbus to the amplifier circuit 5131. The amplifying circuit 5131 may be any form of amplifier circuit, and is configured to amplify the above-mentioned AC component signal to obtain a read signal RS1.

In the audio broadcaster 520, the receiving circuit 523 includes a capacitor C52 and an amplifying circuit 5231. The capacitor C52 is coupled in series between the transmission line Vbus and the amplifier circuit 5231. The amplifying circuit 5231 is coupled to the control circuit 522. The capacitor C52 is configured to receive the signal on the transmission line Vbus, to filter out the DC component signal on the transmission line Vbus, and to transmit the AC component signal on the transmission line Vbus to the amplifier circuit 5231. The amplifying circuit 5231 may be any form of amplifier circuit, and is configured to amplify the above-mentioned AC component signal to obtain a read signal RS2.

The control circuits 512 and 522 are configured to respectively perform analog-to-digital conversion operation on the read signals RS1 and RS2, so as to respectively obtain the second data and the first data in digital form.

Incidentally, during the data transmission process, there may be a certain degree of noise in the audio device 500. Therefore, based on the data transmission frequency of the audio device 500, the signal on the transmission line Vbus may have an unstable voltage value. Therefore, when performing the determination operation of the logic values of the second data and the first data, the charger 510 and the audio broadcaster 520 may determine the logic values of the respectively received second data and first data through multiple voltage ranges. The charger 510 and the audio broadcaster 520 may respectively set three ranges to determine the logic values of the second data and the first data, thereby improving the anti-noise capability of the audio device 500.

Figure 6:
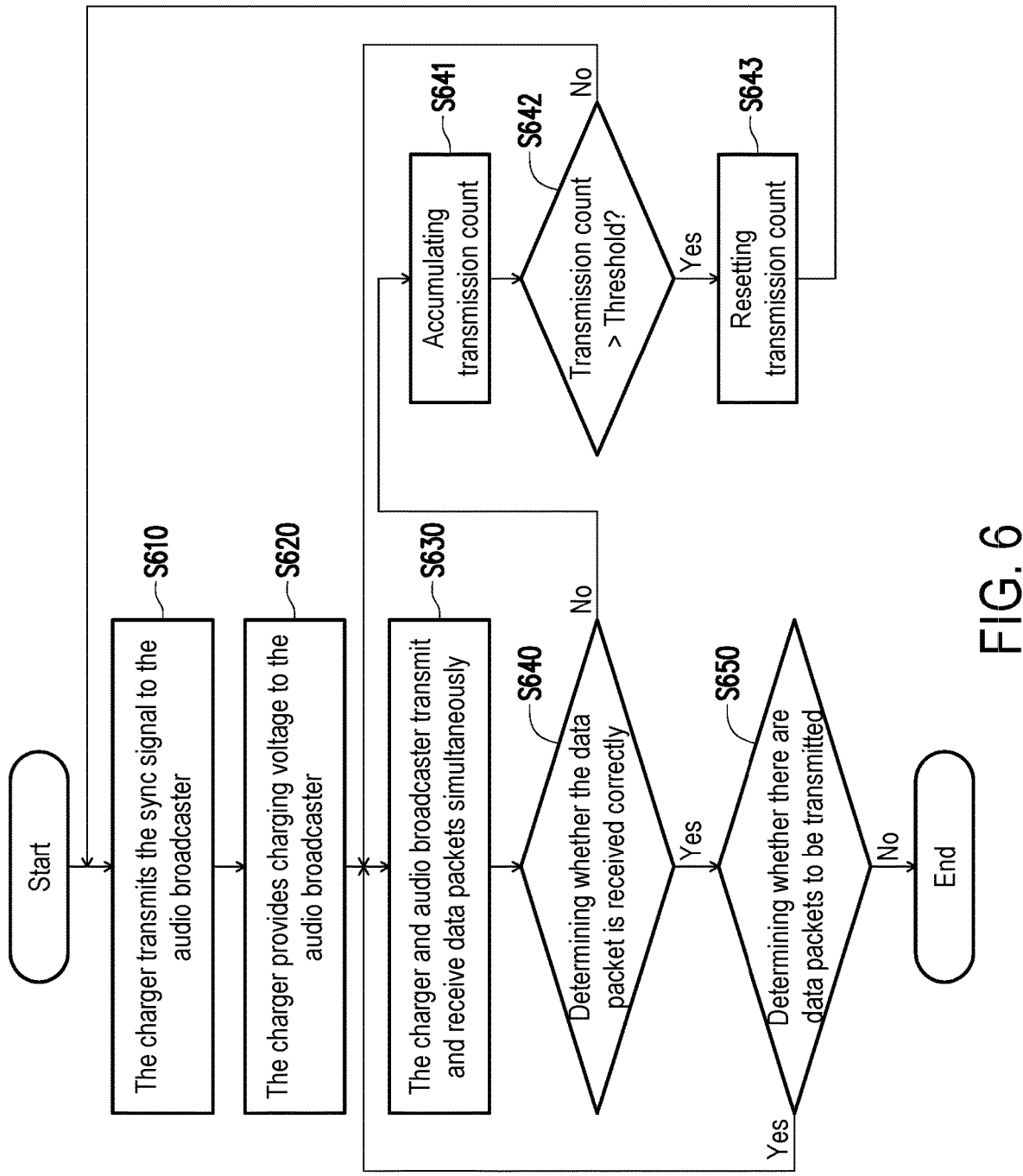
FIG. 6 and FIG. 7 are flowcharts of control methods of audio devices of different embodiments of the disclosure.

Referring to FIG. 6, FIG. 6 is a flowchart of a control method of an audio device of an embodiment of the disclosure. In step S610, the charger transmits a sync signal to the audio broadcaster. In step S620, the charger provides charging voltage to the audio broadcaster. In step S630, the charger and the audio broadcaster may provide data packets simultaneously. In step S640, a determination operation may be performed to determine whether the data packet is received correctly. If the determination result is yes, step S650 may be executed to determine whether there is a next data packet to be transmitted. If the determination result in step S640 is no, step S641 is executed.

In step S641, the transmission count may be accumulated. In step S642, it is determined whether the transmission count is greater than a preset threshold. If the transmission count is not greater than the threshold, step S630 may be executed again. On the contrary, if the transmission count is greater than the threshold, step S643 may be executed to reset the transmission count, and step S610 may be executed so that the charger resends the sync signal to the audio broadcaster to restart the data transmission operation.

In addition, when it is determined in step S650 that there are data packets to be transmitted, step S630 may be executed to perform subsequent data packet transmission operations. On the contrary, if it is determined in step S650 that there are no data packet to be transmitted, this process may be ended.

Figure 7:
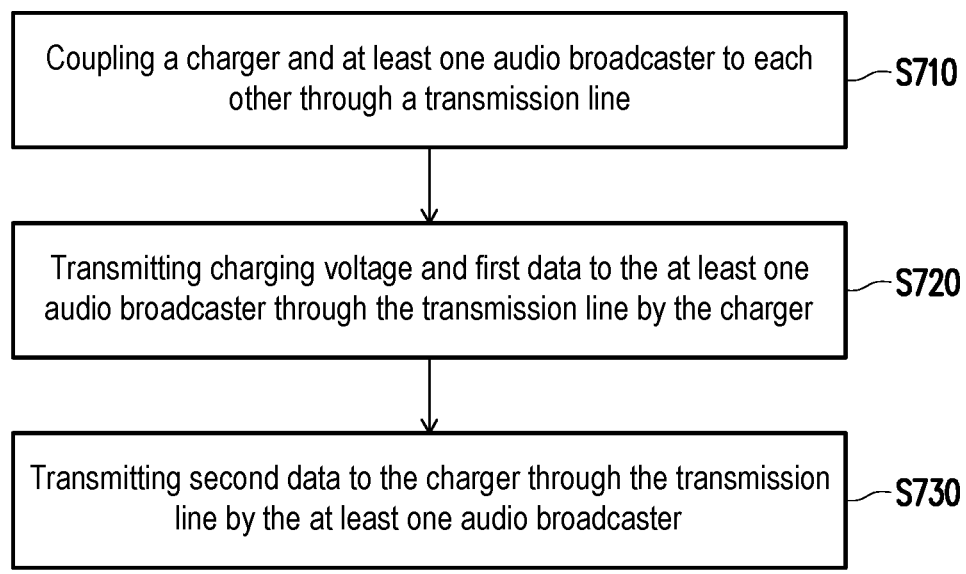

Referring to FIG. 7, FIG. 7 is a flowchart of a control method of an audio device of another embodiment of the disclosure. In step S710, the charger and at least one audio broadcaster are coupled to each other through a transmission line. In step S720, charging voltage and first data are transmitted to the at least one audio broadcaster through the transmission line by the charger. Moreover, in step S730, second data is transmitted to the charger through the transmission line by the at least one audio broadcaster.

The implementation details of the above steps have been described in detail in the foregoing embodiments, and are not be repeated herein.

To sum up, in the audio device of the disclosure, the charger and the audio broadcaster are coupled to each other through a transmission line, in which the transmission line not only provides the charging voltage provided by the charger, but also provides a medium for the charger and the audio broadcaster to transmit data to each other at the same time. In this way, the charger and the audio broadcaster may transmit data to each other at the same time, effectively improving the working efficiency of the audio device.

What is claimed is:

1. An audio device, comprising:
 a charger, coupled to a transmission line and configured to generate a charging voltage; and
 at least one audio broadcaster, coupled to the charger through the transmission line,
 wherein the charger transmits the charging voltage to the at least one audio broadcaster through the transmission line, the charger transmits first data to the at least one audio broadcaster through the transmission line, and the charger receives second data from the at least one audio broadcaster through the transmission line,
 wherein the charger carries the first data onto the charging voltage for transmission to the at least one audio broadcaster, and the at least one audio broadcaster carries the second data onto the charging voltage for transmission to the charger simultaneously.

2. The audio device according to claim 1, wherein the charger comprises:
 a charging voltage generating circuit, generating the charging voltage according to a source voltage and providing the charging voltage to the transmission line;
 a control circuit, coupled to the transmission line, generating the first data, and carrying the first data onto the charging voltage; and
 a receiving circuit, coupled to the transmission line, and filtering out the charging voltage to obtain the second data.

3. The audio device according to claim 2, wherein the control circuit determines whether to pull down the charging voltage to a first voltage according to a logic value of the first data to carry the first data to the charging voltage.

4. The audio device according to claim 3, wherein the first voltage is greater than a reference ground voltage.

5. The audio device according to claim 2, wherein the receiving circuit comprises:
 a capacitor; and
 an amplifying circuit,
 wherein the capacitor is connected in series between the transmission line and the amplifying circuit, the capacitor is configured to filter out a DC component signal of a signal on the transmission line to obtain an AC component signal, and the amplifying circuit amplifies the AC component signal to obtain read data.

6. The audio device according to claim 5, wherein the amplifying circuit further transmits the read data in analog form to the control circuit, and the control circuit converts the read data into digital form to obtain the second data.

7. The audio device according to claim 2, wherein the charging voltage generating circuit is a voltage booster.

8. The audio device according to claim 2, wherein the control circuit comprises:
 a microcontroller; and a signal transmitter, coupled to the microcontroller and the transmission line, and configured to carry the first data onto the charging voltage.

9. The audio device according to claim 8, wherein the receiving circuit comprises:
a capacitor; and
an amplifying circuit,
wherein the capacitor is connected in series between the transmission line and the amplifying circuit, the capacitor is configured to filter out a DC component signal of a signal on the transmission line to obtain an AC component signal, and the amplifying circuit amplifies the AC component signal to obtain read data.

10. The audio device according to claim 8, wherein the amplifying circuit further transmits the read data in analog form to the control circuit, and the control circuit converts the read data into digital form to obtain the first data.

11. The audio device according to claim 1, wherein the at least one audio broadcaster comprises:
a charging control circuit, coupled to the transmission line and providing the charging voltage to charge a battery;
a receiving circuit, coupled to the transmission line and filtering out the charging voltage to obtain the first data; and
a control circuit, coupled to the transmission line, generating the second data, and carrying the second data onto the charging voltage.

12. The audio device according to claim 11, wherein the control circuit determines whether to pull down the charging voltage to a second voltage according to a logic value of the second data to carry the second data to the charging voltage.

13. The audio device according to claim 12, wherein the second voltage is greater than a reference ground voltage.

14. The audio device according to claim 11, wherein the control circuit comprises:
a microcontroller; and
a signal transmitter, coupled to the microcontroller and the transmission line, and configured to carry the second data onto the charging voltage.

15. A control method of an audio device, comprising:
coupling a charger and at least one audio broadcaster to each other through a transmission line;
transmitting a charging voltage and first data to the at least one audio broadcaster through the transmission line by the charger;
transmitting second data to the charger through the transmission line by the at least one audio broadcaster;
providing the charger to carry the first data onto the charging voltage for transmission to the at least one audio broadcaster; and
providing the at least one audio broadcaster to carry the second data onto the charging voltage for transmission to the charger simultaneously.

16. The control method according to claim 15, further comprising:
determining whether to pull down the charging voltage to a first voltage by the charger according to a logic value of the first data to carry the first data to the charging voltage; and
determining whether to pull down the charging voltage to a second voltage by the at least one audio broadcaster according to a logic value of the second data to carry the second data to the charging voltage.

17. The control method according to claim 16, wherein the first voltage and the second voltage are both greater than a reference ground voltage.

* * * * *